United States Patent [19]

Bynum

[11] Patent Number: 5,350,201
[45] Date of Patent: Sep. 27, 1994

[54] SEPARABLE CONNECTOR EXTERNAL CAPTURE DEVICE

[75] Inventor: Kurt K. Bynum, Saline, Mich.
[73] Assignee: Moeller Manufacturing Co., Inc., Wixom, Mich.
[21] Appl. No.: 5,012
[22] Filed: Jan. 15, 1993
[51] Int. Cl.⁵ .............................................. F16L 15/08
[52] U.S. Cl. .................................. 285/92; 285/330; 285/921
[58] Field of Search .................. 285/92, 330, 921; 411/117, 118, 120, 121

[56] References Cited

U.S. PATENT DOCUMENTS

| 315,895 | 4/1885 | Brady . | |
|---|---|---|---|
| 408,320 | 8/1889 | Powell . | |
| 1,433,382 | 10/1922 | Kiper | 285/92 |
| 2,985,425 | 5/1961 | Tang | 285/92 X |
| 3,881,753 | 5/1975 | Bochory | 285/92 |
| 3,945,669 | 3/1976 | Bochory | 285/92 |
| 4,422,675 | 12/1983 | Norris et al. | 285/45 |
| 5,222,768 | 6/1993 | Hofer et al. | 285/92 X |

FOREIGN PATENT DOCUMENTS

| 163589 | 6/1990 | Japan | 285/92 |
|---|---|---|---|
| 624386 | 6/1949 | United Kingdom . | |
| 859598 | 1/1961 | United Kingdom . | |

Primary Examiner—Dave W. Arola
Attorney, Agent, or Firm—James M. Deimen

[57] ABSTRACT

An external capture device for separable connectors used to connect fluid and electrical tubing and conduits. Two or more spring bands or clips are semi-circular and serrated in form and joined by one or more substantially axial bridges or bars. The spring clips are sized to tightly grip the driving external surfaces of the separable connector to be secured. The driving surfaces of the connector may be of differing circumference. Both axial distance and alignment of the driving surfaces are not critical to attachment of the capture device. The capture device may be added or removed from a closed connector, the bridge or bar forming a convenient means for gripping the device.

7 Claims, 1 Drawing Sheet

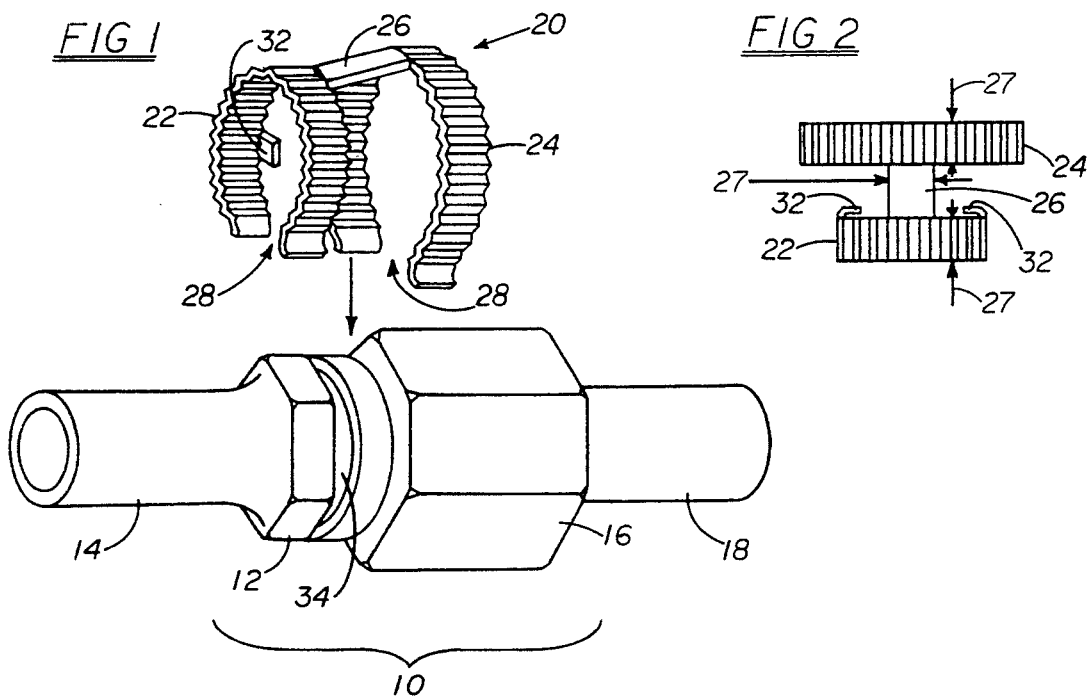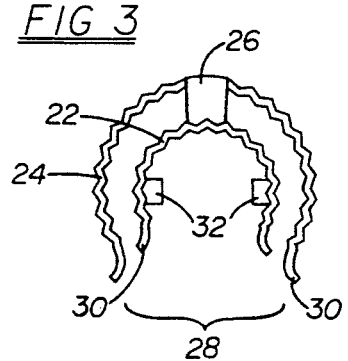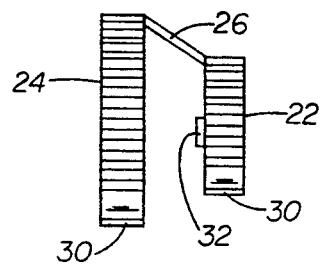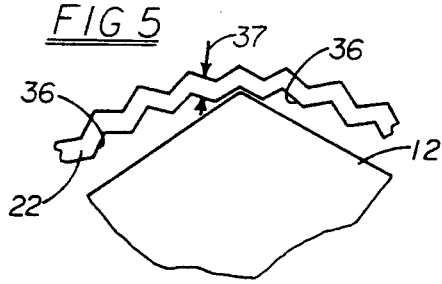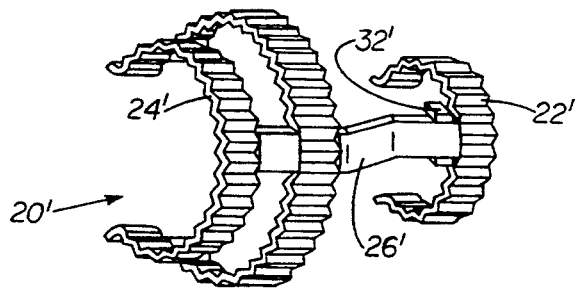

SEPARABLE CONNECTOR EXTERNAL CAPTURE DEVICE

BACKGROUND OF INVENTION

The field of the invention pertains to external secondary locking mechanisms to prevent the relative rotation and loosening of various separable connectors, most commonly threaded connectors. In particular, the invention is directed to the locking of connectors that join tubes, hoses and wiring together or to an accessory unit. The requirements for aerospace applications are particularly stringent, in particular, for use on engines, hydraulic systems, fuel systems and electric cable connectors.

The current and most common means for secondary locking of aerospace connectors are lock wire and safety wire which require special features be incorporated in the connectors. Other means comprise crimp nuts, fibre nuts and tab washers. These external locking devices may permit some small relative rotation of the connector and usually are destroyed or rendered non-reusable in aerospace applications once unlocked to open the connector.

Two early patents, U.S. Pat. No. 315,895 and U.S. Pat. No. 408,320, each disclose a capture device for hexagonal exterior pipe fittings. The latter capture device completely surrounds the fitting requiring that the capture device be slipped over the adjacent pipe of an open connector before closing the connector and sliding the capture device in place. To remove and replace the capture device, the connector must also be fully opened. The former capture device includes a slot for laterally sliding the device into position to engage the two hexagonal exterior surfaces. Both capture devices require that the exterior hexagonal surfaces be aligned for proper engagement.

U.S. Pat. No. 3,881,753 and U.S. Pat. No. 3,945,669 each disclose a capture device in the form of an elongated clip. The elongated clip is open to permit installation on and removal from a connector without opening the connector. This clip also is applicable to both hexagonal and circular exterior connectors, the clip being formed to a specific axial operating length. Thus, the axial length of the connector is critical to the proper operation of the capture device. Relying on axial length, these clips would not be suitable for threaded high pressure connectors.

U.S. Pat. No. 4,422,675 discloses a capture device that completely encloses and seals about a fuel connector to catch any inadvertent leakage from the connector. The capture device is in the form of a sleeve that includes indentations to engage an exterior hexagonal surface on the fuel connector. The indentations form a full hexagon in one embodiment. In the other embodiment the indentations only engage some hexagonal surfaces on the connector and other indentations prevent axial movement of the capture device.

British Patent Specification No. 624,386 discloses full hexagonal tubes to lock together coupling and nut connection combinations where the coupling and nut are both of the same circumference. Also disclosed is a wavy or serrated tube to accommodate misalignment of the flats on the coupling and nut. A tab in one embodiment prevents axial movement of the tube from a closed connector. As above with capture devices that fully surround the connector, the capture devices of this specification can not be added or removed from a closed connector.

British Patent Specification No. 859,598 discloses a semi-hexagonal spring band to prevent relative movement of a hexagonal coupling and nut connector. A portion of the center of the band is displaced to prevent axial movement of the installed band. The form of the band requires that the coupling and nut flats be aligned and the coupling and nut not be tightened closer than the axial width of the displaced portion of the spring band.

SUMMARY OF THE INVENTION

The new capture device comprises two or more semi-circular serrated spring bands or clips joined by one or more bridges or bars extending substantially axially between the springs bands or clips. The clips are sized to tightly grip the driving external surfaces (usually hexagonal) of a separable connector to be secured. The driving surfaces may be of differing circumference with the new capture device and both axial distance and alignment of the flats are not critical. The device may be added or removed from a closed connector, the bridge or bar forming a convenient means for gripping the device to install or remove. No special tools are required and the connector need not be modified. Tab means are provided to limit the axial movement of an installed capture device.

DESCRIPTION OF THE DRAWINGS

FIG. 1 is an exploded perspective view of the new capture device being applied to a connector;

FIG. 2 is a plan view of the capture device;

FIG. 3 is an end view of the capture device;

FIG. 4 is a side elevation of the capture device;

FIG. 5 is a cutaway detail of a contact location between the capture device and a connector; and FIG. 6 is a perspective view of a modified form of the capture device.

DESCRIPTION OF THE PREFERRED EMBODIMENT

Illustrated in FIG. 1 is a connector 10 typical of the connectors used in the aircraft industry. The connector 10 includes a first portion 12 integral with the tubing 14 and having a hexagonal exterior portion or drive surface suitable for engagement by a wrench to tighten or loosen the connector. A hexagonal nut 16 is rotatable and axially moveable relative to a second tube 18 and when fully engaged to the first portion 12 retains the connector 10 and tubes 14 and 18 tightly together. Although fully and properly tightened such a connector 10 can inadvertently loosen as a result of severe vibration or impact. The connector 10 may also be routinely opened and retightened during maintenance procedures resulting in a different rotational alignment between the hexagonal exterior of the first portion 12 and the hexagonal exterior of the nut 16 with each retightening.

Illustrated just above the connector 10 and in FIG. 2 is a new capture device generally denoted by 20 to prevent vibrational and impact loosening of the connector. The capture device 20 comprises a pair of serrated clips 22 and 24 integrally connected by a bar 26 therebetween. The bar 26 is about the same width 27 as the clips 22 and 24. Clip 22 is radially sized to engage the hexagonal exterior of the first portion 12 and clip 24 is radially sized to engage the hexagonal exterior of the nut 16.

As best shown in FIG. 3 each clip 22 or 24 is open 28 over a portion less than 180° of its circumference and diametrically opposite the bar 26. To assist in engaging the capture device 20 the ends 30 of the clips 22 and 24 are bent or flared outwardly as shown. A pair of tabs 32 extend radially inwardly from clip 22 as shown in FIGS. 2,3 and 4. The tabs 32 extend into a circumferential groove 34 formed by the tightened connector 10 to prevent excessive axial movement of the engaged capture device 20. As best shown in FIG. 5 the clips 22 and 24 are formed with numerous serrations 36 to create numerous possible engagement locations with the hexagonal exteriors of the first portion 12 and nut 16. Thus, relative rotational position of the first portion 12 to the nut 16 is not significant and changes in fully tight relative rotational position after retightenings can be accommodated by the numerous serrations 36. With the multiple serrations 36 the device will not permit any significant relative rotation of the connector portion 12 and nut 16.

Illustrated in FIG. 6 is a modified capture device 20' wherein the bar 26' is significantly longer between the clips 22' and 24' and sloped at the center of the bar only. Such a form provides more clearance of the bar with extended length connectors. Tabs 32' may extend inwardly from the bar 26'.

In aircraft applications, particularly engine applications, materials that retain the resilience of a spring at high temperature are best suited for the capture device. Titanium and Inconel are examples of suitable metals. For less demanding applications, spring steel or nylon plastic may be suitable. Other possible materials are hardened stainless steel, heat treated aluminum alloys and carbon fiber composites.

The design of the new capture device will permit installation and removal by hand or with simple pliers depending on the size and elasticity of the clips 22 and 24. A typical new capture device has clips 0.200 inches in axial width and encompasses 250°-300° of the connector surfaces (hexagonal or otherwise). Although described in terms of engagement with drive surfaces, the engaged surfaces need not be drive surfaces on the connector.

The resilience of the clips 22 and 24 prevents relative rotation of the connector parts despite vibration, thermal cycling and torsional loading. With a sufficient number of serrations on the clips, the connector need not be overtightened or backed off for the clip.

The new capture device can be modified to secure connectors with more than two driving or wrench surfaces such as tube-to-coupling-to-tube, bulk head connectors, T-connectors and jam nut connectors. The new capture device may have three or more clips joined by bridges or bars as required. And for non-hexagonal driving surfaces, one clip may be shaped more closely to the surface shape rather than semi-circular. Accommodation of any relative angular position of the driving surfaces is retained by the semi-circular shape of the second and additional serrated clips.

Although shown inboard, the tabs 32 may extend radially inwardly at any location appropriate to the particular connector configuration. The tabs 32 must only be so located as to prevent undue axial displacement resulting in axial detachment of one of the clips 22 or 24 from a drive surface.

Although shown with a constant wall thickness and therefore a wavy serrated configuration, the clips 22 and 24 may be formed with a smooth outside surface and serrated inside surface as one alternative. As another alternative, the wall thickness 37 may vary to provide a uniform force or load at each contact location with a drive surface.

The configuration of the new capture device lends to efficient manufacture by progressive die stamping followed by heat treating for hardening appropriate to the particular metal. Plastics may be injection molded to shape with suitable fibrous fillers in the resin mix.

I claim:

1. A connector capture device comprising at least two open and spaced apart clips co-axial about a common axis, each clip being circumferentially discontinuous anal formed to encompass substantially more than 180° but less than 360° about one of a plurality of non-cylindrical surfaces on a connector, said non-cylindrical surfaces being rotatable relative to each other,
    at least one of said clips being formed with multiple serrations on an inner surface thereof for engagement with said non-cylindrical surfaces, the number of said serrations on the clip being sufficient to obviate adjustment of the relative rotational position of the non-cylindrical surfaces in preparation for installation of the capture device, and
    a bar joining the clips, the bar spacing the clips axially about the common axis for engagement with co-axial non-cylindrical surfaces.

2. The connector capture device of claim 1 wherein the two open clips are substantially semi-circular and of differing diametral size, at least a portion of said bar extending between said clips non-parallel to the common axis of the capture device.

3. The connector capture device of claim 1 including means extending radially inwardly to limit axial displacement of the capture device.

4. The connector capture device of claim 1 wherein at least one clip includes ends terminating the circumferential discontinuity, the ends being flared radially outward at the circumferential discontinuity of the clip.

5. The connector capture device of claim 1 wherein at least one clip includes a non-uniform wall thickness to provide a substantially uniform force for all contact locations of the clip with the non-cylindrical surface.

6. The connector capture device of claim 1 wherein the width of the bar is substantially equal to the width of the clips.

7. The connector capture device of claim 1 wherein the clips encompass 250°-300° of the non-cylindrical surfaces.

* * * * *